United States Patent
Kimbrough et al.

[11] Patent Number: 5,926,388
[45] Date of Patent: Jul. 20, 1999

[54] SYSTEM AND METHOD FOR PRODUCING A THREE DIMENSIONAL RELIEF

[76] Inventors: Thomas C. Kimbrough; Deborah A. Kimbrough, both of 2322 Gimlet St., Port Charlotte, Fla. 33948

[21] Appl. No.: 08/740,269

[22] Filed: Oct. 25, 1996

Related U.S. Application Data

[63] Continuation-in-part of application No. 08/352,509, Dec. 9, 1994.

[51] Int. Cl.$^6$ .................................................... G06F 19/00
[52] U.S. Cl. ................................ 364/468.25; 364/474.05; 264/219; 118/681; 446/391; 409/79
[58] Field of Search ...................... 364/474.05, 474.03, 364/474.22, 474.08; 409/79; 264/219, 221; 29/896.4; 64/23; 40/456; 434/386; 345/425; 382/128; 600/395; 128/782

[56] References Cited

U.S. PATENT DOCUMENTS

| | | | |
|---|---|---|---|
| 5,080,109 | 1/1992 | Arme, Jr. ................................. | 128/782 |
| 5,116,174 | 5/1992 | Fried ......................................... | 409/79 |
| 5,314,370 | 5/1994 | Flint ......................................... | 446/391 |
| 5,429,682 | 7/1995 | Harlow, Jr. et al. ..................... | 118/681 |
| 5,543,103 | 8/1996 | Hogan et al. ............................ | 264/219 |

*Primary Examiner*—Reba I. Elmore
*Assistant Examiner*—Sheela S. Rao
*Attorney, Agent, or Firm*—Frank A. Lukasik

[57] ABSTRACT

A method and system for producing a three-dimensional image of a person's head and the relief produced by the process. The method may be used for producing a three dimensional charm or pendant of a person's face, a three dimensional model of a person's head, a precision formed mold for casting, glass blowing, plastic injection, blow molding, extrusion, thermo forming, manufacturing liquid containers and machine molds for die stamping. A 3-D scanner moving linearly, employs an advanced optical range-finding technique in which a safe, low powered laser projects a vertical plane of light onto a stationary subject to be digitized. The digitized measurements are converted to provide the appropriate milling program. The digitizer then transfers the measurements onto a database on a graphic work station for immediate viewing and editing. The scanned image is sent to the computer where the image is converted into computer codes and is then sent onto a milling machine to be turned into a 3-D relief to replicate the original image.

5 Claims, 8 Drawing Sheets

SYSTEM AND METHOD FOR PRODUCING A THREE DIMENSIONAL RELIEF

RELATED APPLICATIONS

This is a Continuation-In-Part of application Ser. No. 08/352,509, Filed Dec. 9, 1994 which was filed under Disclosure Document No. 362391.

BACKGROUND OF THE INVENTION

1. Field of the Invention

The present invention relates to a system and method of producing a three-dimensional image of a person's face and the human relief produced by the process. More particularly, the manufacturing process may be used to produce a three dimensional charm or pendant of a person's face, a three dimensional model of a person's head, a precision formed mold for casting, glass blowing, plastic injection, blow molding, extrusion, thermo forming, manufacturing liquid containers and machine molds for die stamping.

2. Description of the Prior Art

Several prior art devices disclose the use of scanners for taking measurements by scanning the objects and then converting the measurements to milling machines to mill a resultant output. One such device is shown in U.S. Pat. No. 4,575,805 to Moermann et al which discloses a method and apparatus for the fabrication of custom shaped implants. The three dimensional shape parameters of the implant required to restore the tooth in function and appearance are computed on the basis of the recorded contour data. These parameters are then used in a program sequence which controls a milling, cutting or erosive process to manufacture the restorative inlay.

U.S. Pat. No. 4,611,288 to Duret et al discloses an apparatus for taking odontological or medical impressions. Reflected waves are transformed into numerical data which is used directly to operate a numerically controlled machine in the fabrication process. U.S. Pat. No. 5,056,204 to Bartschi discloses a method of producing hearing aids by determining the measurements of the inner ear by a laser apparatus and storing them in a computer. The computer controls a milling cutter on which a blank consisting of plastic material into which all necessary components have been molded is shaped by means of a milling operation to provide a shape corresponding to the inner space of the ear.

U.S. Pat. No. 5,067,086 to Yamazaki et al discloses a three dimensional shape machining laser device for performing three dimensional machining. The device comprises a teaching box, a sensor for detecting the distance between the distal end of a nozzle, and a work control apparatus which includes command storage apparatus for storing the Numerical Control (NC) commands, NC command execution apparatus for executing the NC commands, tracing apparatus for controlling the gap between the nozzle and the work to a predetermined value, interrupt control apparatus for interrupting the execution of an NC command program, correction value calculation apparatus, and correction apparatus for correcting command values in accordance with the correction command values etc.

U.S. Pat. No. 5,274,563 to Matsura et al discloses a non-contact tracing control system for tracing and machining a workpiece through a tracing of the contour of a model without contact.

U.S. Pat. No. 5,314,370 to Flint discloses a process for producing a doll by scanning a person's face, transferring the signal to a color transfer printer and printing the resulting image on a wax layer supported on a substrate. The wax layer is pressed and heated against a layer of natural fabric to transfer the wax layer onto a layer of fabric. The fabric layer is secured, image outward, onto the facial area of the doll.

U.S. Pat. No. 5,543,103 to Hogan et al discloses a process of surface shaping involving creating a three-dimensional depiction of an object, selecting a portion of the three-dimensional depiction and incorporating the selected portion as an integral part of a wall surface. Hogan et al states that the new digitizers generate massive files and complex surface data, they routinely exceed the capacity and capability of existing CAD/CAM software and machine tools to produce the required shapes.

None of the prior art devices have the necessary resolution to convert a 3-D, life-sized image, into a finished, reduced size relief, on the face of a coin sized blank, a precision formed mold for casting or other forms of plastic manufacture, or the larger sized 3-D total model of a human head as accomplished by the instant invention.

SUMMARY OF THE INVENTION

It is, therefore, an object of the invention to provide a method of manufacturing objects, having a 3-D image of a human's head.

It is also an object of the invention to provide custom made jewelry having a 3-D image of an accurately reproduced relief of a person's face machined thereon.

It is another object of the invention to produce a mold comprising a portion of a total 3-D model of a human's head.

A still further object of the invention is to produce a total 3-D sculpture of a human's head.

Still another object of the invention is to produce machine molds for die stamping.

To achieve the objects, the present invention employs an advanced, optical range-finding technique in which a safe, low powered laser projects a vertical plane of light onto the human face to be digitized. The digitized measurements are converted to provide the appropriate milling program. The digitizer then transfers the measurements onto a database on a graphic work station for immediate viewing and editing. The scanned image is sent to the computer where the image is converted into computer codes and is then sent onto a milling machine to be turned into a finished product. The milling machine, following the codes sent to it, will cut a blank to replicate the original image. A first output of the process of the invention is a charm which is a physically accurate, three dimensional relief of a child's face milled out of sterling silver. The process may also create coins for jewelry which may also be attached to containers. The whole process, from posing the subject, scanning the subject, and then milling the charm takes less than twenty minutes.

The charm and pendant jewelry sales business is a long and established one, with millions of mothers and grandmothers buying them as a child turns a year older. No one makes a true 3-D charm that shows what the child actually looks like, only simple versions with an outline of a generic child. The instant process takes it one step further to an actual relief of the child.

Pendants and charms are a main stay of the retail jewelry business, and have been for years. The generic charm, worn by grandmothers and mothers, have been selling for about 40 years. The instant invention brings the charm to the 90's with three dimensions. Using a low intensity laser light to scan a person's face to get a true three dimensional image, then using a computer driven milling machine to create a sterling silver, three dimensional charm or pendant. This will give a real charm with a real person's face on it, and all this can be done in less than 20 minutes.

A second product of the process and system is a full scale bust of a person's head for portrait sculpture. A third product of the process is a model of a human's face to be used to make a doll's head. The portrait sculptures may vary from BARBIE DOLL™ size to a full adult size.

A fourth product of the process and system is a reverse relief model of a human's face, to make a reverse cut into metal for forming molds and die stamping tools. The size of the model is to be limited only by the size of the container or doll to be produced.

Each of the above products may be made of pewter, brass, copper, aluminum, white metals or any other metal, for example. Materials may also include glass, porcelains, ceramics and include, but are not limited to vinyl and rubber (doll's heads). The containers to be manufactured by the dies and molds mentioned above may include glass, plastics, ceramics (bottles, coffee cups, glasses), or soda bottles with medallions attached thereto. The bottles may include sports faces formed on the bottles. The dolls would have a real child's face similar to the charm mentioned above. The full busts may be miniature or full size or oversized. The size of the model would only be limited by the size of the product to be generated by the system and process.

DESCRIPTION OF THE PREFERRED EMBODIMENT

Figure 3:
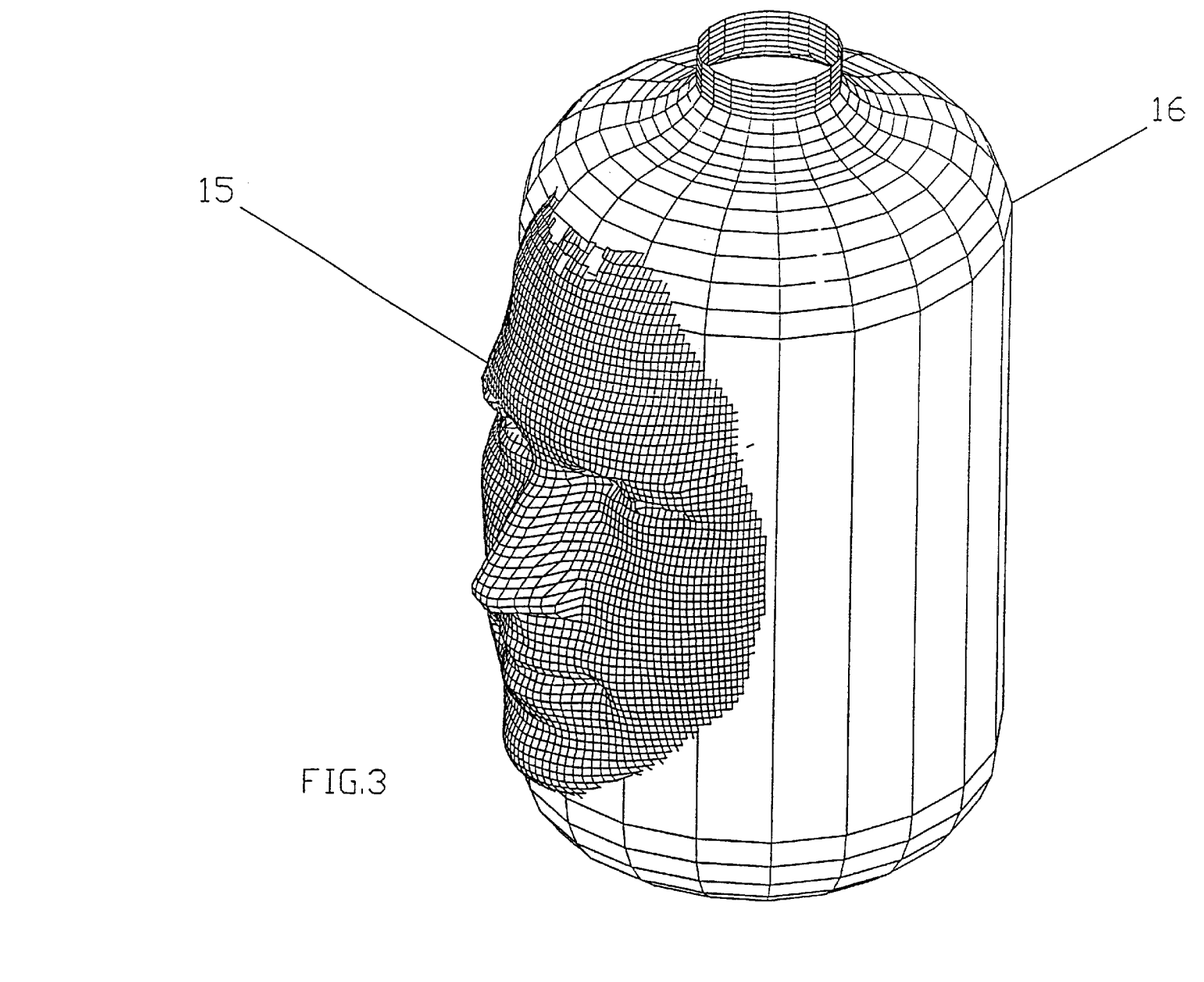
FIG. 3 is a schematic representation of a container produced in accordance with the invention.
Figure 4:
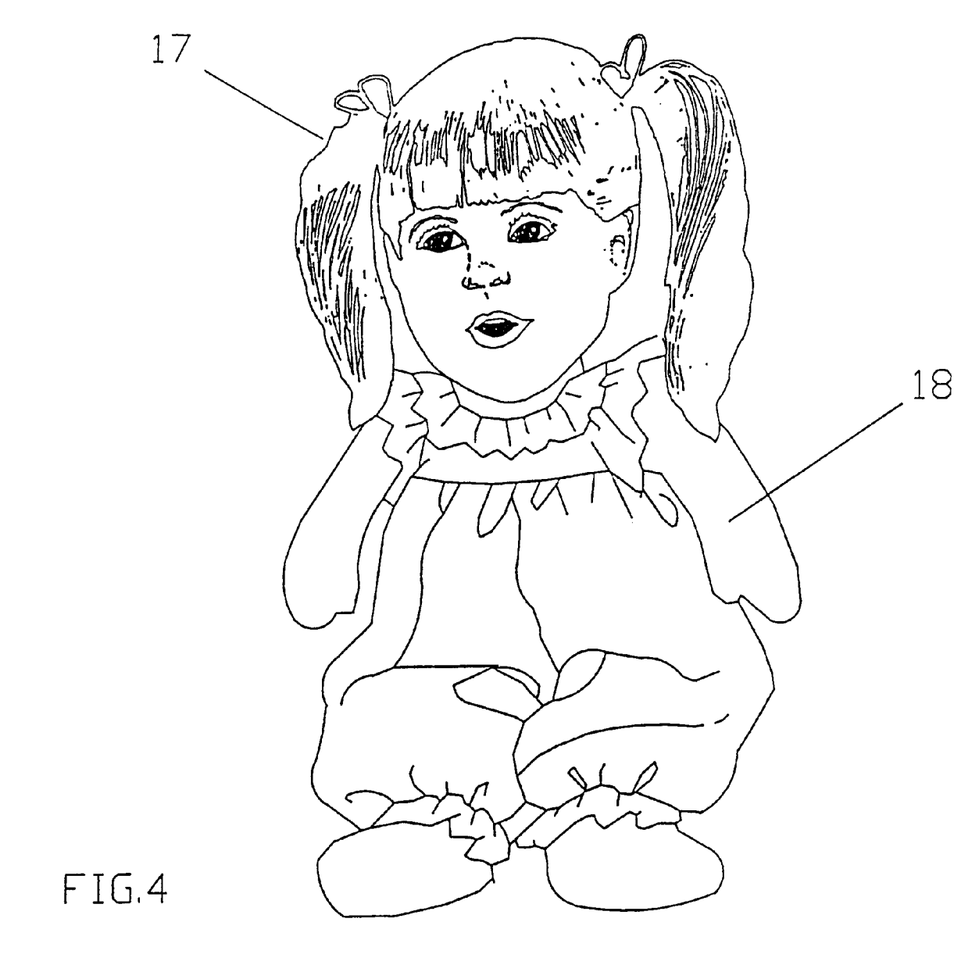
FIG. 4 is a schematic representation of a doll having a model of a human's face.
Figure 5:
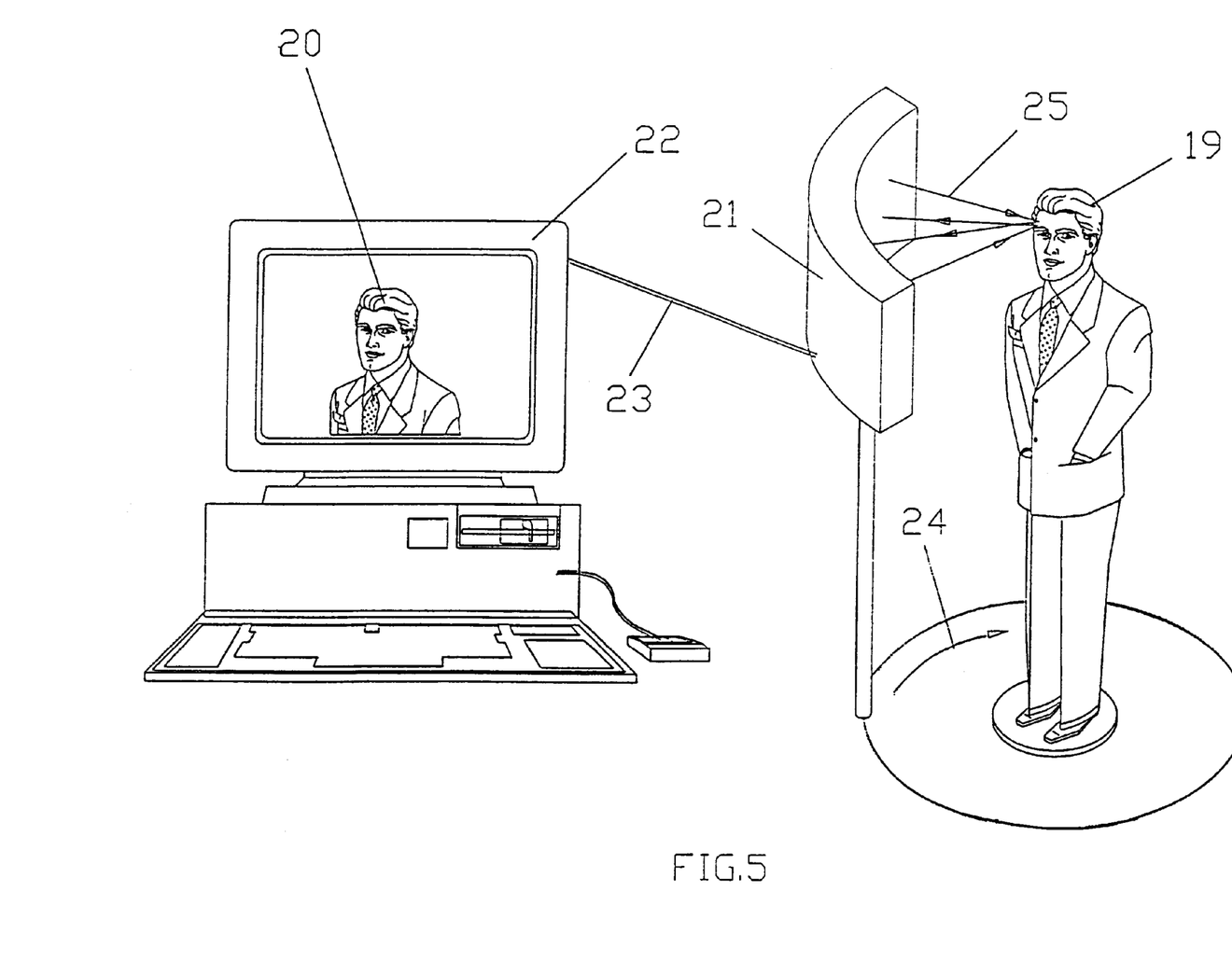
FIG. 5 is a a schematic representation of an optical range-finding technique, a digitizer, and a graphic work station.
Figure 6:
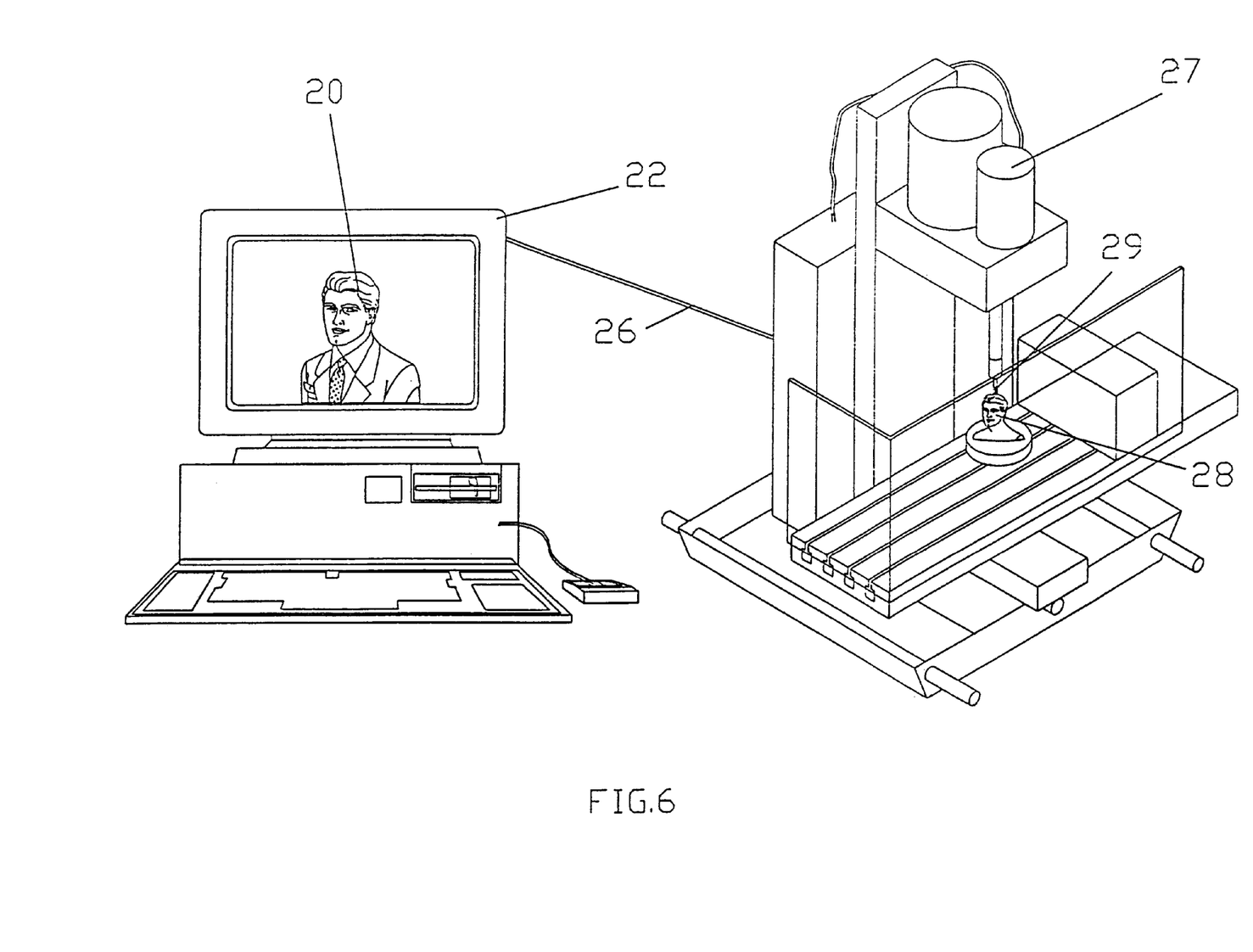
FIG. 6 is a schematic representation of a work station and a milling machine for producing the 3-D image of the invention.

The system and method of manufacturing a 3-D image of a person's face or head is shown in FIGS. 1 through 8. The system shown in FIGS. 5 and 6 is used to generate each of the abovementioned products and will be described firstly to produce a piece of jewelry shown in FIG. 1. The other products described above may be manufactured by re-programming the system.

Figure 1:
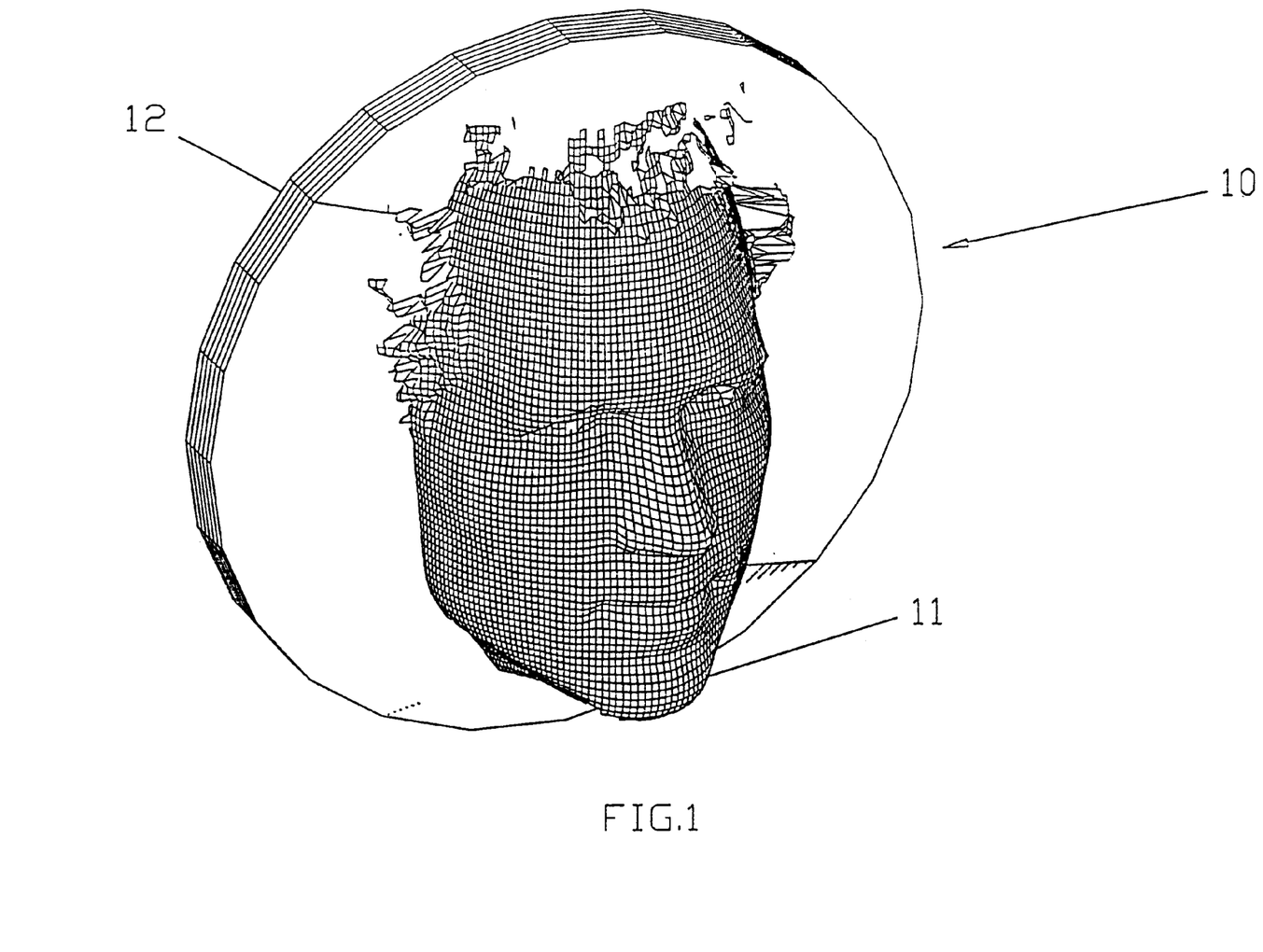
FIG. 1 is a front perspective view of a 3-D image of a person's face reproduced in accordance with the invention.

FIG. 1 shows a piece of jewelry, a 3-D relief of a person's face, and is generally designated by the numeral 10. A physically accurate, three dimensional relief of a person's face is milled out of, for example, sterling silver, and is indicated by the numeral 11 formed from a blank 12.

The ultimate purpose of the instant invention is to make several products. The first product is a personalized charm or a pendant, or other type of jewelry, but not the generic ones now bought by mothers, and grandmothers, but a three dimensional relief of the actual child's face. The other products are, a full scale bust of a person's head for portrait sculpture, a model of a human's face to make a doll's head, and a reverse relief model of a human's face to make a reverse cut into metal for forming molds and die stamping tools.

As shown in FIGS. 5 and 9, the images produced will be of faces and/or profiles of people who stand or sit in front of the laser scanner, digitizer 21. The blanks 12, 14 and 31, shown after machining in FIGS. 1, 2, 6, 7, and 8, may be of sterling silver, gold, wax, resin, pewter, or plastic. The shapes (not shown) may be round, oval, heart, square, rectangular, and triangular. The 3-D relief of a person's face 10 may be used as jewelry or decorations in, but not limited to the following: pendants, charms for bracelets, or chains, earrings, rings, belt buckles, key chains and lockets. The raised relief 10 is similar to a coin.

The instant invention will do all of the above by scanning the child's face and then making a sterling silver three dimensional charm bracelet or pendant for the child's parents or grandparents. Instead of the standard charms worn by mothers and grandmothers on their bracelets, the instant invention takes a three dimensional scan of a person's face, and using the latest computer and milling technology, mills a physically accurate 3-D relief charm, one and one eighth inch around, in less than 20 minutes. The usual polishing and finishing are then performed similar to the processes used in fabricating customized jewelry.

The finished product, a 3D relief of a person's face 10 may be used for other types of jewelry, such as pendants, tie-tacs, earrings, etc.

The actual production of jewelry 10 is a combination of scanning, software adjustments and high-speed milling. As shown in FIG. 5, a subject may stand, or sit on a raised chair and in seven seconds the face is scanned with a low level laser beam 25. A 3-D laser digitizer 21, employing an advanced optical range finding technique, in which a safe, low power laser projects a vertical plane of light (laser beam 25) onto the subject to be digitized, is used in the present invention. Digitizer 21 is supported by a motion platform (shown by arrow 24) which moves the digitizer 21 along a rotary scan path. The digitizer 21 moves while the object 19 to be digitized remains stationary. The platform 24 is completely controlled by software running on a work station 22. Mirrors pick up the resulting lighted contour on the subject from two viewpoints. The use of two contour views greatly reduces any inaccuracies due to shadowing. The views are combined optically, then scanned by a precision video sensor (not shown) in digitizer 21.

Specialized electronics digitize the video image to create a rectangular range map—an array of distance measurements. The digitizer 21 sweeps the plane of laser light around the subject, digitizing one contour at a time, until a complete range map has been created to describe the subject. The digitizer 21 collects approximately 15,000 range measurements per second and can make the measurements relative to a plane.

Each value in a range map represents an average of the subject's surface in a small region. Variations in surface brightness from region to region do not affect the digitizer's accuracy. Digitizer 21 simultaneously collects color information via a second video sensor (not shown). The digitizer 21 acquires a color value for each region in the range map and stores this value along with the distance data. The digitizer 21 transfers the range map into a database on a graphics workstation 22 via a standard Ethernet link 23. The acquired 3-D model 20 can be viewed immediately after digitizing to confirm a high quality scan.

The software in the digitizer 21 controls the digitizing process and allows interaction with data once it is acquired. The software works in a window-based environment under mouse control, providing an intuitive interface. The software first configures the digitizer's 21 scanning procedure. Software controls all aspects of digitizing, there are no knobs or other controls on the digitizer 21.

When a scan is completed, and the data resides in the workstation 22, the data can be viewed as a 3-D model 20. There is no wait for data massaging or other post-scan processing. Within seconds of starting a scan, the results can be seen. The 3-D model can be viewed from any angle in the form of a wireframe (for example FIG. 1), or a shaded surface. Slices and sections of the model may also be viewed. In addition to viewing reference marks acquired by the digitizer's 21 color subsystem, reference points can be placed anywhere on the model 20.

A typical charm or pendant produced by the process of the invention is approximately 30 mm in diameter and approximately 2 mm thick. In order to compress and reduce the digitized image of a life sized human face into a 30 mm diameter by 2 mm thickness and retain the minute, distinctive, features of the face, a unique step in the software operating the digitizer 21 is used. A typical application of prior art digitizers consists of duplicating actual size prototypes or duplicating cavities or other voids to manufacture mating parts or generally producing actual size reproductions.

As shown in FIG. 6, after the subject reviews the 3-D model 20 to verify the image, the digitized information is sent to the milling machine 27 through connection 26. A blank 12, 14, or 31, found in FIGS. 1, 2, and 7, respectively, having the desired properties can thereupon be selected and fixed on the NC milling machine 27 whose milling tools 29 are appropriate to the dimensions and the curves of the faces 11 to be fabricated. The model of a human face 20 may also be used to produce a doll's head as shown in FIG. 4 by merely selecting the appropriate material for blank 12.

The desktop milling machine 27 will then mill the silver, rubber, plastic or other material blank 12 with milling tool 29, or grind the blank 12 according to the NC information from the digitizer 21 and workstation 22. Approximate milling time is under 20 minutes. The milling machine 27 has a polymer composite machine base. This high-tech material has the stiffness to cut materials like steel and has several times more dampening than cast iron, resulting in more accurate machining, smooth surfaces, and extended tool life. Vibration of the blanks 12, 14, and 31, found in FIGS. 1, 2, and 7, respectively, should be avoided on the workpiece carrier of the machine, thereby guaranteeing a fixed point of reference for the cutting operation as well.

The milling machine 27 features an industry standard R8 taper spindle. Pre-loaded ball bearings provide radial and axial rigidity for smooth and accurate machining. The drive mechanism uses a zero-backlash recirculating ball-nut lead screw to move the precision-ground cast iron cross slide and spindle head. Precision-ground and hardened shafts ride inside low friction plane bearings coated with lightweight oil, keeping friction to a minimum and providing accurate response to machine instructions.

The milling machine 27 requires a personal computer (workstation 22) to run the easy to use menu-driven control software. It is also an intelligent desktop prototype and manufacturing system with many capabilities. With its embedded motion control and serial interface, one computer can control all the functions, from CAD/CAM to CNC. Milling machine 27 consists of a full 3-axis CNC mill using the menu-driven software.

Milling machine 27 motion control system employs a closed-loop system with servo drive motors. Machine 27 control system compares the NC part program motion instructions with the actual machine position and makes adjustments to correct the difference. The servo motors provide greater resolution and feedback than stepper motors, allowing the machine to make smaller motions, giving more precise finished products and a faster cutting time. A one horsepower spindle motor and infinitely variable speed control allows a choice of speeds.

Figure 2:
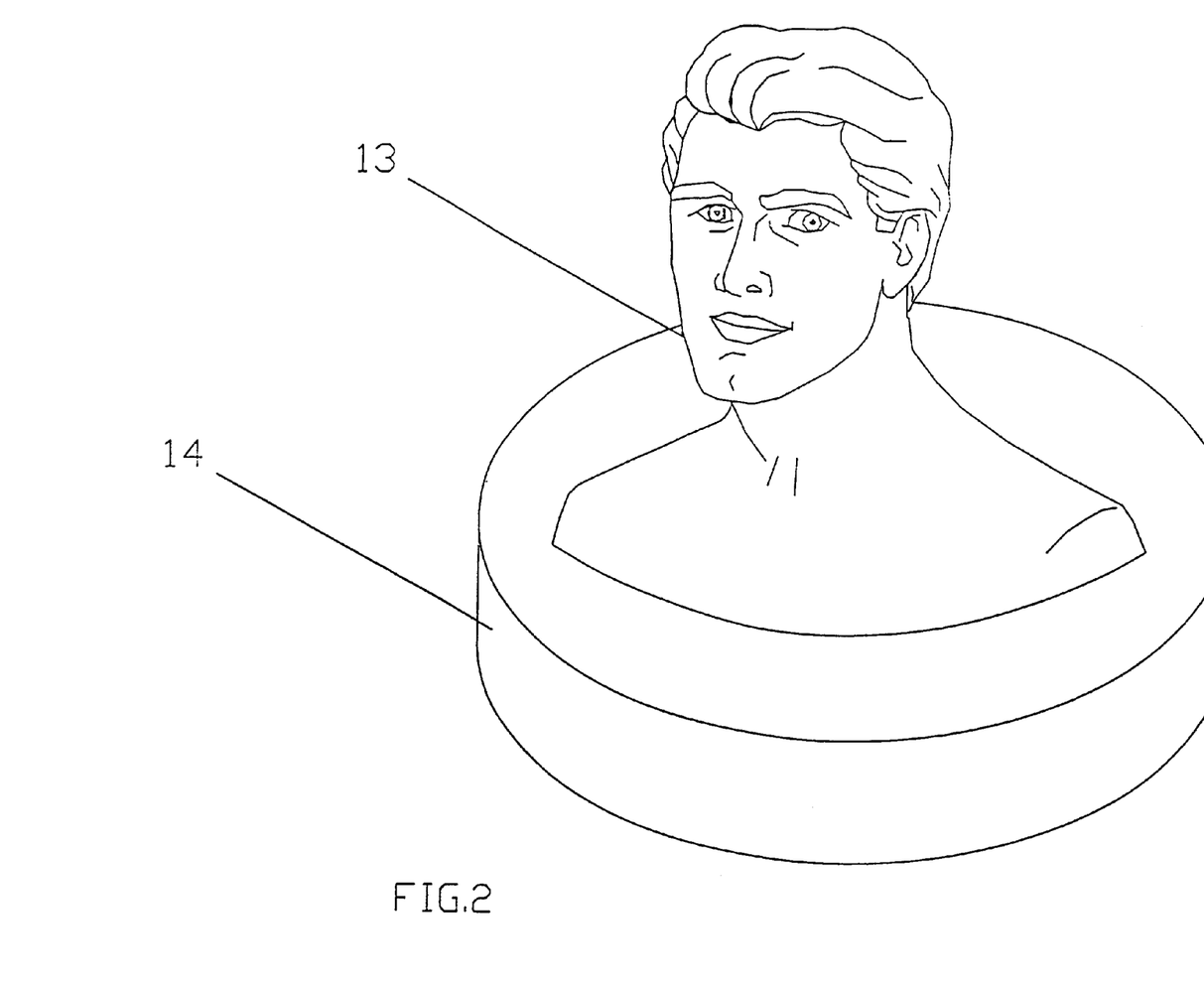
FIG. 2 is a bust of a person's head for portrait scuplture made in accordance with the invention.

As shown in FIG. 2, a blank 14 may be used to machine a full or reduced scale bust of a person's head for portrait sculpture. As shown in FIG. 5, the process and system described above may be reprogrammed to scan the object 19, 360° to produce a full size sculpture 13 (FIG. 2) and 28 (FIG. 6).

Figure 7:
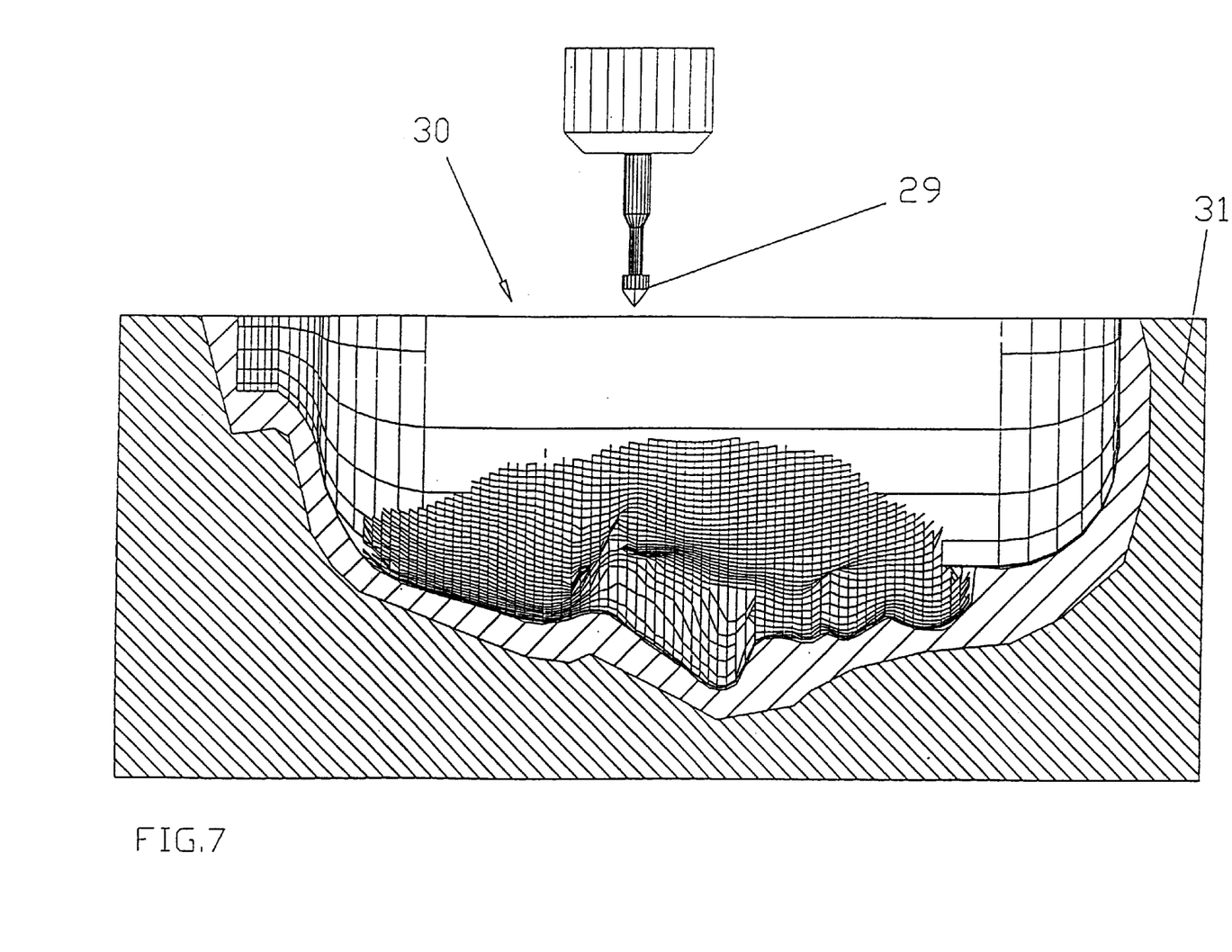
FIG. 7 is a side perspective view of a 3-D relief image of a person's face reproduced in accordance with the invention.
Figure 8:
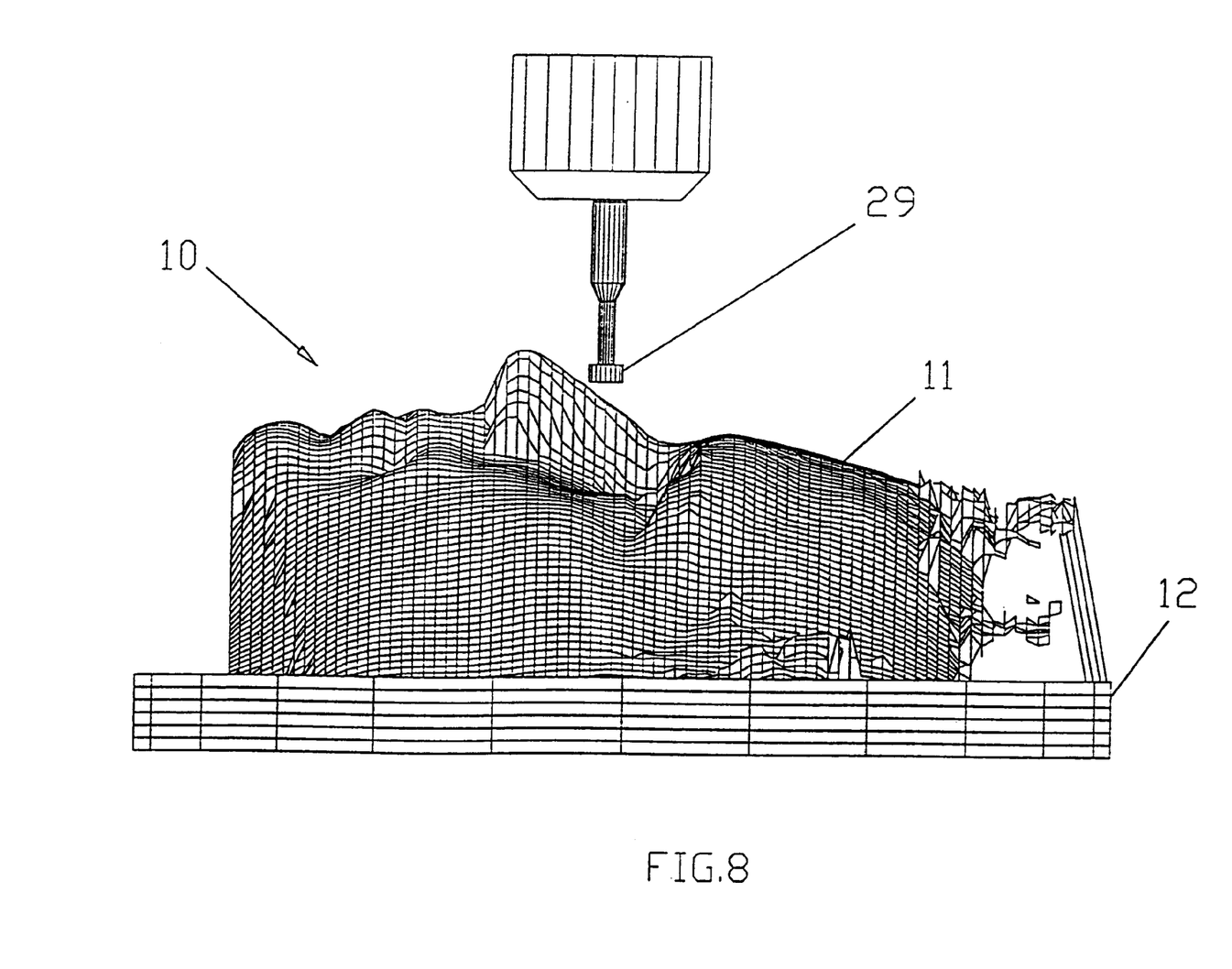
FIG. 8 is a side perspective view of a 3-d image of a person's face reproduced in accordance with the invention.

FIG. 3 shows a container 16 formed by a mold or die material 31 (FIG. 7) which has a reverse model of a human's face 15 milled out of a solid block of aluminum or other mold or die material 31 as shown in FIG. 7. The same procedure may be used to produce a die for stamping metal objects with the human's face 15. When the image of the face 15 has been formed into material 31, and as part of a wall surface, the mold can be used in known fashion to repeatedly produce high quality copies as part of the wall of such objects as plastic, glass, aluminum cans, paper containers, and many other objects.

In a preferred embodiment, a Cyberware Model 3030 rapid 3D digitizer with an LN motion platform were used. The Cyberware equipment is supplied by Cyberware, 8 Harris Court, Monterey, Calif. 93940. An invisible infrared laser of 780 nm wavelength is used in place of the usual orange-red 632 nm laser. The same safety classification is attained. The laser light used in the instant invention is very low level. It is less than 80 millionths of a watt into a maximally dilated pupil for less than 2/10 second, as the light passes the eyes. The U.S. Food and Drug Administration regulates the use of lasers and Cyberware portrait digitizers are rated in the lowest class (Class I).

A Silicon Graphics Computer Systems of the INDIGO™ family of desktop workstations, which combines the key elements of workgroup collaboration, interactive media, and computing, was used. The Indy™ workstation's fast application performance is based upon a bandwidth, 64-bit system architecture featuring the MIPS™ RISC R4X00™ CPU technology, 267 MB/sec system bus, and 400 MB/sec memory bus. The Indy™ workstation was obtained from Silicon Graphics Computer Systems, 2011 N. Shoreline Boulevard, Mountain View, Calif. 94043.

The milling machine 22, consisted of a proLIGHT 200 Machining Center manufactured by LIGHT MACHINES Corporation, 444 East Industrial Park Drive, Manchester, N.H. 03109-5317.

While there is shown and described a present preferred embodiment of the invention, it is to be distinctly understood that the invention is not limited thereto, but may be otherwise variously embodied and practiced within the scope of the following claims.

What is claimed is:

1. A system for manufacturing a three-dimensional product having a three dimensional image of an accurately reproduced relief of a person's head machined on a blank, said system comprising:

- a 3-D laser digitizer employing an advanced optical range finder, using a low power laser, projecting a vertical plane of light using two contour views onto a subject to be digitized, a first contour view creating an array of distance measurements, said digitizer digitizing one contour at a time until a complete range map has been created, and a second contour view simultaneously collecting color information and creating a color value for each of said array of distance measurements,
- a video sensor for optically scanning and combining said two views, and transferring said range map into a database on a graphics work station via an ethernet link,
- a motion platform supporting said digitizer and moving said digitizer along a scan path,
- a work station having control means for configuring said digitizer's scanning procedure, maintaining a video image database, and generating a compressed and reduced size digitized video image for controlling a milling machine, and
- a desktop milling machine having a vibration dampening base for machining a blank to form a three dimensional relief of a person's head.

2. A method of manufacturing a three-dimensional product having a three dimensional image of an accurately reproduced relief of a person's head machined on a blank, said method comprising the steps of:

posing a subject to be reproduced on the product, scanning said subject with an advanced, optical range-finder using a safe, low powered laser, projecting a vertical plane of light and using two contour views, a first contour view creating an array of distance measurements and a second contour view creating an array of distance measurements and a second contour view creating a color value for each of said distance measurements, optically scanning and combining said two contour views with a video sensor and producing a video image, digitizing said video image one contour at a time until a complete range map has been created and simultaneously collecting color information and creating a color value for each of said array of distance measurements, transferring said video image into a database on a graphics workstation via an ethernet link, compressing and reducing said video image from life size to a three dimensional model, transferring said digitized video image to a milling machine, fixing a blank to be machined on said milling machine, and milling said blank and thereby producing a three dimensional image of a person's head on said blank.

3. A product produced by the process of claim 2 comprising:

a blank having a physically accurate, full scale bust of a person's head machined thereon.

4. A product produced by the process of claim 2 wherein said blank is a soft material having a human face machined thereon for forming a doll's face.

5. A product produced by the process of claim 2 comprising: a blank having a physically accurate, reverse relief model of a human's head machined therein for forming molds and die stamping tools.

* * * * *